(12) United States Patent
Kim et al.

(10) Patent No.: US 9,069,873 B2
(45) Date of Patent: Jun. 30, 2015

(54) APPARATUS AND METHOD FOR CREATING MASHUP WEB APPLICATION

(75) Inventors: Jae-Chul Kim, Daejeon (KR); Seong-Ho Lee, Daejeon (KR); Young-Jae Lim, Daejeon (KR); Yoon-Seop Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 359 days.

(21) Appl. No.: 13/597,574

(22) Filed: Aug. 29, 2012

(65) Prior Publication Data
US 2013/0212147 A1     Aug. 15, 2013

(30) Foreign Application Priority Data
Feb. 13, 2012    (KR) ........................ 10-2012-0014161

(51) Int. Cl.
*G06F 15/16*     (2006.01)
*G06F 17/30*     (2006.01)

(52) U.S. Cl.
CPC ............................... *G06F 17/30893* (2013.01)

(58) Field of Classification Search
USPC ..................... 709/217, 219; 719/328, 329
See application file for complete search history.

(56) References Cited

U.S. PATENT DOCUMENTS

| 7,941,546 B2 * | 5/2011 | Rice et al. ..................... 709/227 |
| 2009/0193148 A1 | 7/2009 | Jung et al. |
| 2013/0067302 A1 * | 3/2013 | Chen et al. ..................... 715/202 |

FOREIGN PATENT DOCUMENTS

| KR | 10-2009-0063636 A | 6/2009 |
| KR | 10-2009-0083835 A | 8/2009 |
| KR | 10-2010-0129516 A | 12/2010 |
| WO | WO 2009/078568 A1 | 6/2009 |

* cited by examiner

*Primary Examiner* — Viet Vu
(74) *Attorney, Agent, or Firm* — Rabin & Berdo, P.C.

(57) ABSTRACT

An apparatus for creating a mashup web application includes: a web application authoring unit configured to generate a web application initial page from previously stored block resources and web application resources during web application authoring login, receive UI-based web application authoring information through the web application initial page, and generate web application metadata; and a workflow management unit configured to generate a final web application by verifying a workflow of the web application metadata.

17 Claims, 10 Drawing Sheets

APPARATUS AND METHOD FOR CREATING MASHUP WEB APPLICATION

CROSS-REFERENCE(S) TO RELATED APPLICATIONS

This application claims priority to Korean Patent Application N. 10-2012-0014161, filed on Feb. 13, 2012, which is incorporated herein by reference in its entirety.

BACKGROUND OF THE INVENTION

1. Field of the Invention

Exemplary embodiments of the present invention relate to an apparatus and method for creating a mashup web application; and, particularly, to an apparatus and method for creating a mashup web application, which helps a mobile device user with no programming knowledge to create a mashup web application.

2. Description of Related Art

The aim of mashup is to create new software, services, or databases by merging information and services which are provided on the web.

Korean Patent Laid-Open Publication No. 10-2009-0063636 (Jun. 18, 2009) disclosed a method for creating a mashup application, entitled "Method and apparatus for servicing API and creating API mashup, and computer readable medium thereof". As described in that document, a mashup developer first plans which kind of mashup to create, and then searches and selects open APIs which are to be used for producing the planned mashup.

Suppose that the mashup developer decided to produce a mashup service using the Google map open API and the Flickr open API. In this case, the mashup developer analyzes the Google map open API and the Flickr open API to figure out the characteristics of the respective open APIs (for example, communication protocol, data format, form of input/output data and the like). Open API service providers generate user account information and a user verification key, and provide the generated information and key to the developer.

The mashup developer secures open APIs, implements a mashup function by referring to manuals provided by the open API service providers, and decides on the layout of an HTML page, thereby completing final mashup contents.

Therefore, the mashup developer must handle matters related to the mashup implementation, such as the communication protocol and the data format conversion.

In particular, since the respective open API providers use different methods to provide open API services, the mashup developer must analyze various API services and learn techniques related thereto. Furthermore, the mashup relies on the ability of the developer.

In addition, since codes and scripts related to open APIs forming the mashup are arbitrarily produced by the developers, it is difficult to update the open APIs on which the mashup is based or add a new open API to an existing mashup.

SUMMARY OF THE INVENTION

An embodiment of the present invention is directed to an apparatus and method for creating a mashup web application, which provides sub modules related to the authoring of new blocks and web applications, which are the goal of mashup, such that even general users with no programming or UI design knowledge may easily take part in developing mashup web applications.

Another embodiment of the present invention is directed to an apparatus and method for creating a mashup web application, which helps general users to easily participate in producing a mashup web application, thereby increasing the range and applicability of mashup web application development.

Other objects and advantages of the present invention can be understood by the following description, and will become apparent with reference to the embodiments of the present invention. Also, it will be obvious to those skilled in the art to which the present invention pertains that the objects and advantages of the present invention can be realized by the means as claimed and combinations thereof.

In accordance with an embodiment of the present invention, an apparatus for creating a mashup web application includes: a web application authoring unit configured to generate a web application initial page from previously stored block resources and web application resources during web application authoring login, receive UI-based web application authoring information through the web application initial page, and generate web application metadata, and a workflow management unit configured to generate a final web application by verifying the workflow of the web application metadata.

The web application unit may include: a block resource search section configured to search for the previously stored block resources and web application resources; a web application metadata generation section configured to receive the web application authoring information, including the previously stored block resources and web-application resources, and generate the web application metadata; and a web application metadata transmission section, configured to transmit the web application metadata to the workflow management unit.

The web application metadata may include one or more of content, a position of the content, information on the creator, copyright information, terms of use, and usage history.

The workflow management unit may include: a workflow verification section, configured to verify the workflow of the web application metadata; and a web application generation section, configured to generate the final web application when the verification is completed.

The web application authoring unit may receive a block resource from a block resource management unit.

The block resource management unit may include: a block resource storage section, configured to store the block resource; a block resource update section configured to update the block resource by transmitting the block resource to the block resource storage section in real time, when the block resource is generated; a block resource search permission section configured to permit block resource search when the web application authoring unit creates a web application; and a block resource providing section configured to provide the block resource stored in the block resource storage section such that the workflow management verifies or updates the workflow of the web application metadata based on the block resource.

The web application authoring unit may receive a web application resource from a web application resource management unit.

The web application resource management unit may include: a web application resource storage section configured to store a resource of the final web application; a web application resource update section configured to update the resource of the final web application by transmitting the resource to the web application resource storage section in real time, when the workflow management unit generates the final web application; a web application resource search permission section configured to permit a search for previously stored web application resources, when the web application authoring unit creates a new web application; and a web application resource providing section configured to provide the previously-stored web application resources to the web application authoring unit.

The apparatus may further include a block authoring unit configured to generate the block resources for the generation of the web application initial page.

The block authoring unit may include: a block metadata generation section configured to generate metadata of a block from an open API, during block authoring login; a block code generation section configured to generate source code, which contains program logic of the block, from a block library; and a block resource transmission section configured to transmit a block resource including the generated metadata and source code.

The block metadata may include one or more of service, operation, inputs, outputs, attributes, and events to be provided.

The apparatus may further include a web application preview unit configured to provide a preview image by applying the final web application in a mobile device environment.

In accordance with an embodiment of the present invention, a method for creating a mashup web application includes: generating, by a web application authoring unit, a web application initial page from previously stored block resources and web applications during web application authoring login; receiving, by the web application authoring unit, UI-based web application authoring information through the web application initial page, and generating web application metadata; and verifying, by a workflow management unit, the workflow of the web application metadata and generating a final web application when the verification is completed.

The generating of the web application initial page from the previously stored block resources and web applications during web application authoring login may include: generating, by a block authoring unit, metadata of a block from an open API during block authoring login; generating, by the block authoring unit, source code of the block from a block library; and storing, by the block authoring unit, block resources including the generated metadata and source code.

The verifying the workflow of the web application metadata further may comprise updating the web application by adding a block resource to the web application metadata.

The method further may comprise, after the generating the final web application, storing and managing, by a web application resource management unit, a resource of the final web application.

The method further may comprise, after the generating the final web application, providing, by a web application preview unit, a preview image by applying the final web application to a mobile device environment.

DESCRIPTION OF SPECIFIC EMBODIMENTS

Figure 1:
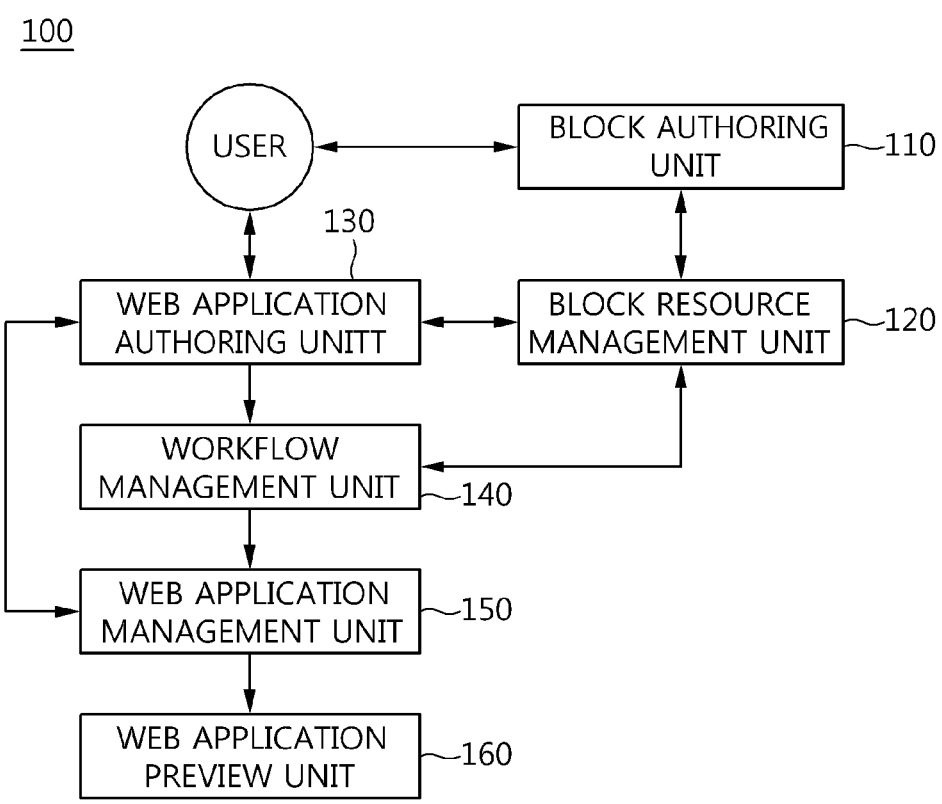
FIG. 1 is a diagram explaining the configuration of an apparatus for creating a mashup web application in accordance with an embodiment of the present invention.

Exemplary embodiments of the present invention will be described below in more detail with reference to the accompanying drawings. The present invention may, however, be embodied in different forms, and should not be construed as being limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Hereinafter, an apparatus for creating a mashup web application in accordance with an embodiment of the present invention will be described as follows with reference to the accompanying drawings.

FIG. 1 is a diagram explaining the configuration of the apparatus for creating a mashup web application in accordance with the embodiment of the present invention.

Figure 2:
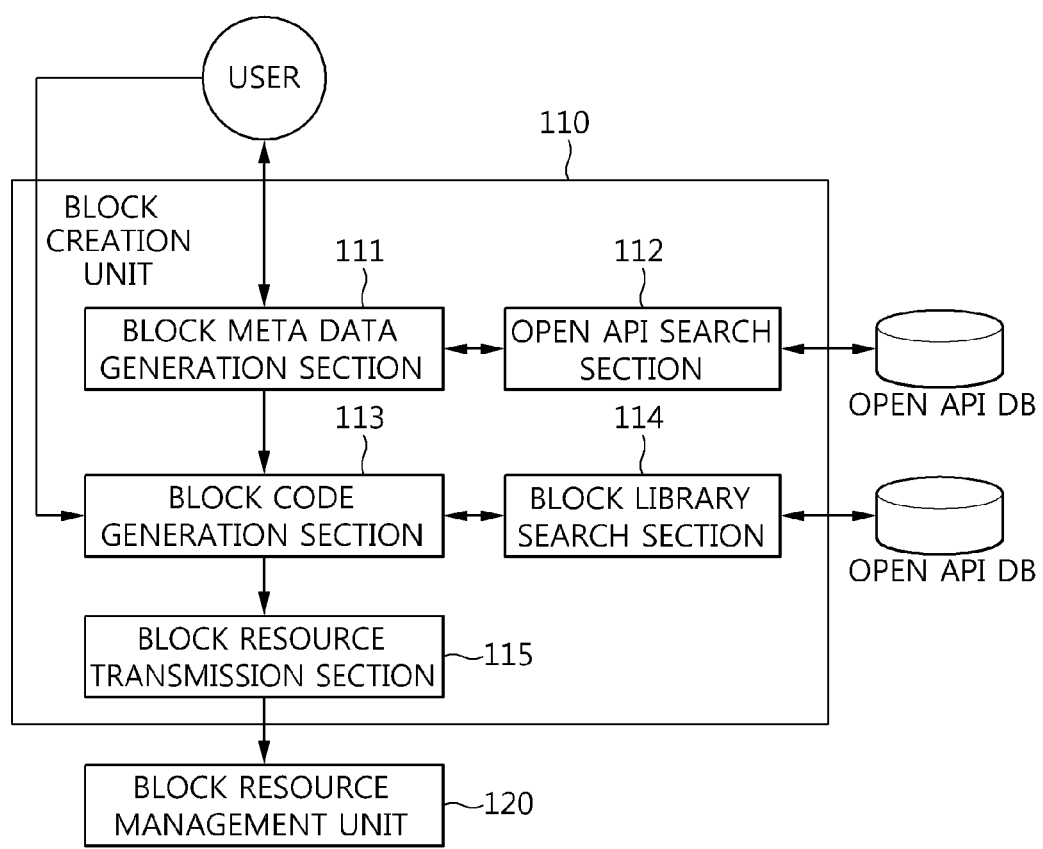
FIG. 2 is a diagram explaining the detailed configuration of a block authoring unit employed in the apparatus in accordance with the embodiment of the present invention.

FIG. 2 is a diagram explaining the detailed configuration of a block authoring unit employed in the apparatus in accordance with the embodiment of the present invention.

Figure 3:
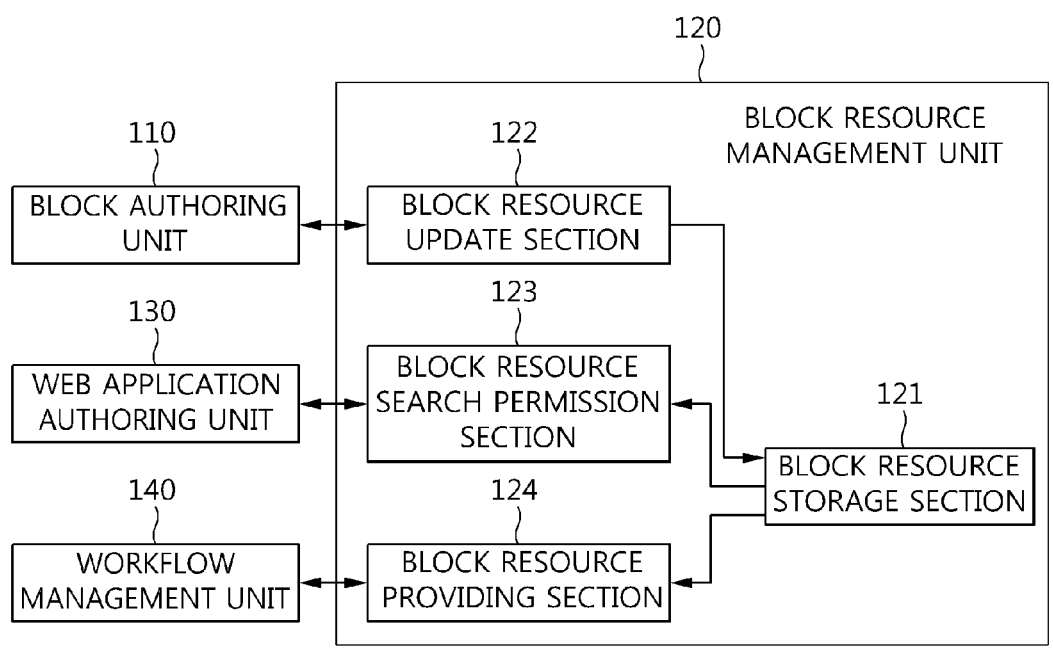
FIG. 3 is a diagram explaining the detailed configuration of a block resource management unit employed in the apparatus in accordance with the embodiment of the present invention.

FIG. 3 is a diagram explaining the detailed configuration of a block resource management unit employed in the apparatus in accordance with the embodiment of the present invention.

Figure 4:
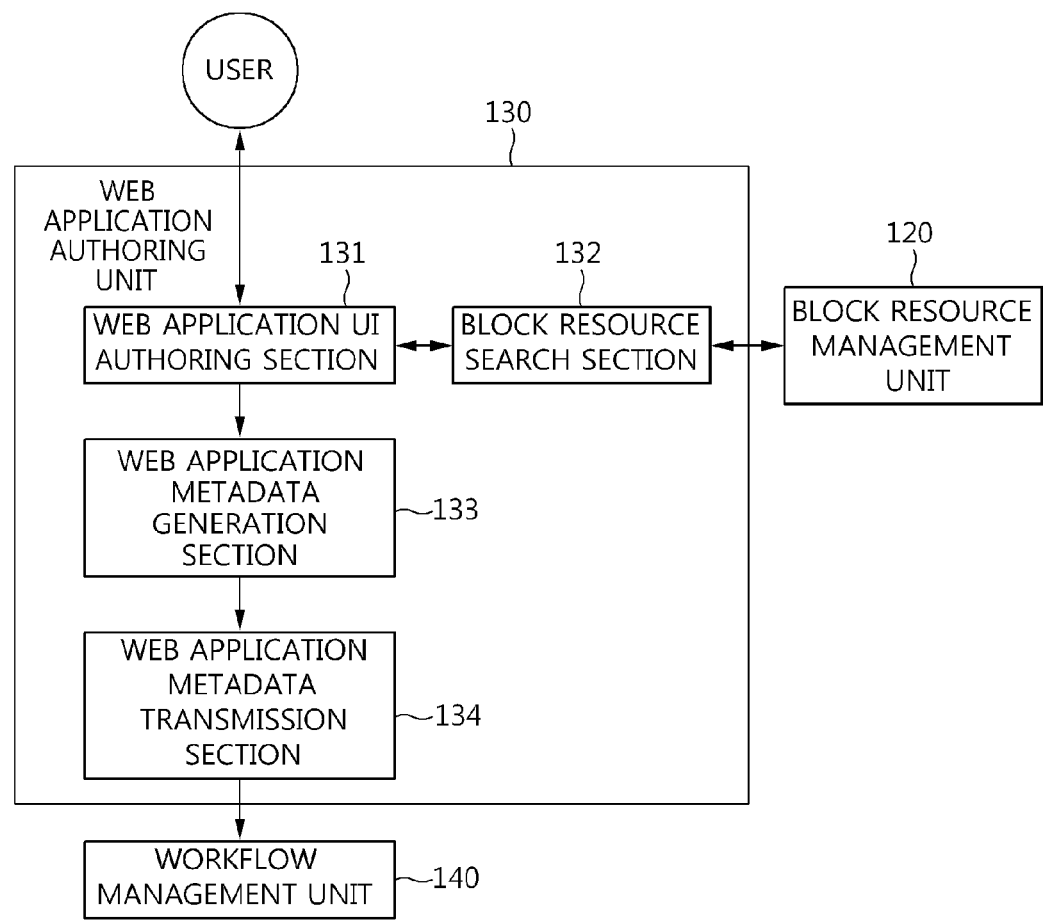
FIG. 4 is a diagram explaining the detailed configuration of a web application authoring unit employed in the apparatus in accordance with the embodiment of the present invention.

FIG. 4 is a diagram explaining the detailed configuration of a web application authoring unit employed in the apparatus in accordance with the embodiment of the present invention.

Figure 5:
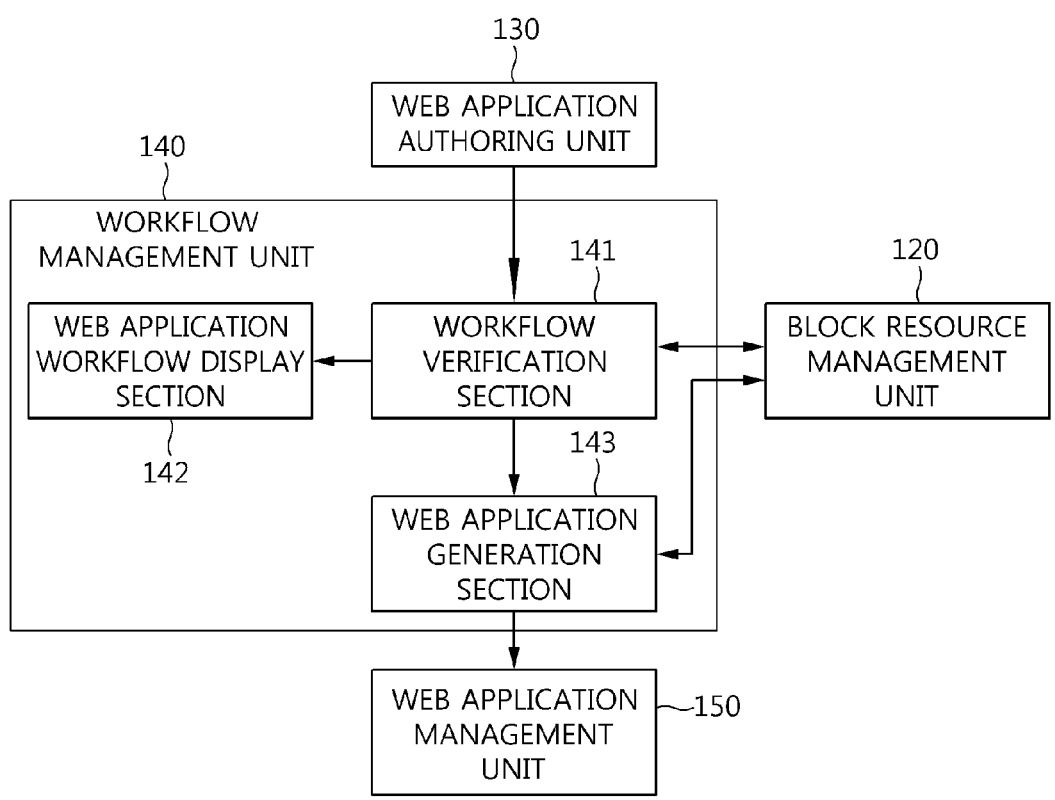
FIG. 5 is a diagram explaining the detailed configuration of a workflow management unit employed in the apparatus in accordance with the embodiment of the present invention.

FIG. 5 is a diagram explaining the detailed configuration of a workflow management unit employed in the apparatus in accordance with the embodiment of the present invention.

Figure 6:
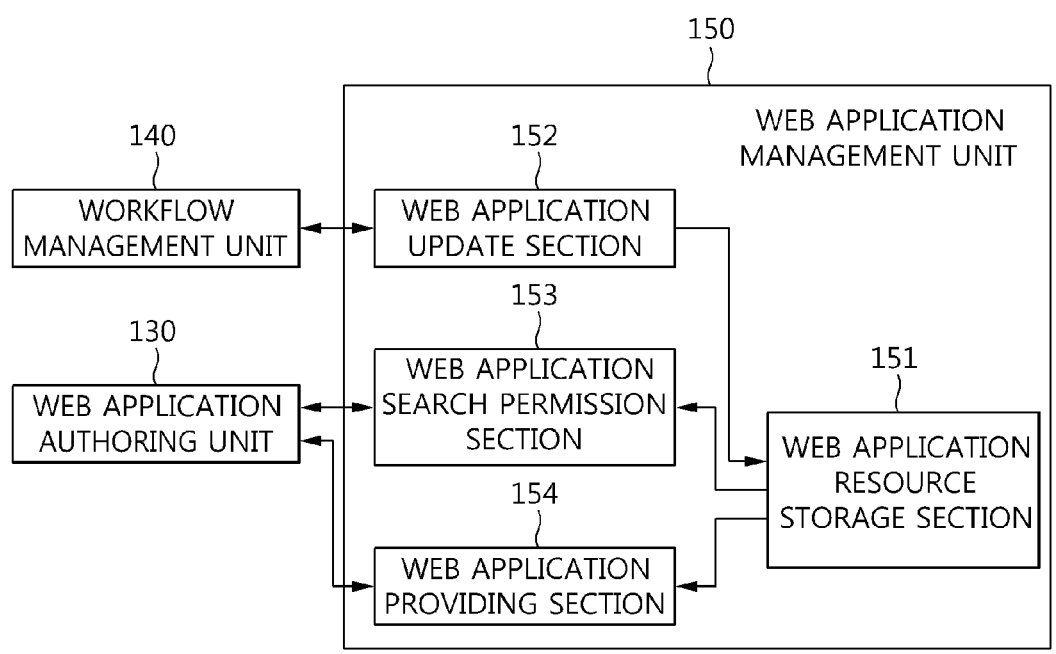
FIG. 6 is a diagram explaining the detailed configuration of a web application resource management unit employed in the apparatus in accordance with the embodiment of the present invention.

FIG. 6 is a diagram explaining the detailed configuration of a web application resource management unit employed in the apparatus in accordance with the embodiment of the present invention.

Referring to FIG. 1, the apparatus 100 for creating a mashup web application in accordance with the embodiment of the present invention includes a block authoring unit 110, a block resource management unit 120, a web application authoring unit 130, a workflow management unit 140, a web application resource management unit 150, and a web application preview unit 160.

The block authoring unit 110 is configured to create a block resource, which is the goal of a mashup, using an open API. That is, the block authoring unit 110 requests the block source management unit 120 to search for a block resource, and provides a block authoring initial page to a user such that the user may create a block.

For this operation, as illustrated in FIG. 2, the block authoring unit 110 includes a block metadata generation section 111, a block code generation section 113, and a block resource transmission section 115.

The block metadata generation section 111 is configured to generate metadata of a block from the open API, during block authoring login. At this time, the block metadata generation section 111 generates metadata by searching an open API database (DB) through an open API search section 112. Here, the block metadata includes one or more of service, operation, inputs, outputs, attributes, and events to be provided.

The block code generation section 113 is configured to generate source code including program logic of the block from a block library. At this time, the block code generation section 113 generates the source code by searching the open API DB through a block library search section 114.

The block resource transmission section 115 is configured to transmit a block resource including the block metadata and the source code to the block resource management unit 120.

The block resource management unit 120 is configured to store and manage the block resource created by the block authoring unit 110 and a previously created block resource.

For this operation, as illustrated in FIG. 3, the block resource management unit 120 includes a block resource storage section 121, a block resource update section 122, a block resource search permission unit 123, and a block resource providing section 124.

The block resource storage section 121 is configured to store a block resource. At this time, the block resource may include a block resource created by the block authoring unit 110 and a previously created block resource.

The block resource update section 122 is configured to update the block resource of the block authoring unit 110 by transmitting the block resource to the block storage section 121 in real time.

The block resource search permission section 123 is configured to permit the web application authoring unit 130 to search for a block resource, when the web application authoring unit 130 creates a web application.

The block resource providing section 124 is configured to provide the stored block resource such that a previously created web application is verified or updated based on the stored block resource when the workflow management unit 140 verifies the previously created web application.

The web application authoring unit 130 is configured to create web application metadata using the stored block resource and a web application resource. The web application authoring unit 130 requests the block resource management unit 120 to search for the web application resource and generates a web application initial page for a user based on the search result. Then, the web application authoring unit 130 receives UI-based web application authoring information from the user and generates the web application metadata.

For this operation, as illustrated in FIG. 4, the web application authoring unit 130 includes a block resource search section 132, a web application metadata generation section 133, and a web application metadata transmission section 134.

The block resource search section 132 is configured to receive a resource search request from a user who logs in to create a web application, and to search block resources and web application resources, which are stored, respectively, in the block resource management unit 120 and the web application resource management unit 150. At this time, the block resource search section 132 receives UI-based web application authoring information transferred from a web application UI authoring section 131 through the searched block resources and web application resources, and provides a basis on which the user may create a web application.

The web application metadata generation section 132 is configured to receive the web application authoring information and generate web application metadata. At this time, the web application metadata include one or more of the actual content, the position of the content, information related to the creator, copyright information, terms of use, and usage history.

The web application metadata transmission section 133 is configured to transmit the web application metadata to the workflow management unit 140.

The workflow management unit 140 is configured to generate a final web application by verifying the workflow of the web application metadata. Furthermore, the workflow management unit 140 may correct or update a web application by adding a block resource to the web application metadata.

For this operation, as illustrated in FIG. 5, the workflow management unit 140 includes a workflow verification section 141, a workflow display section 142, and a web application generation section 143.

The workflow verification section 141 is configured to verify the workflow of the web application metadata and provide the verification result to the workflow display section 142, and the workflow display section 142 is configured to display the verification result.

The web application generation section 143 is configured to generate the final web application when the verification is completed.

The web application resource management unit 150 is configured to provide a web application resource to the web application authoring unit 130. That is, the web application resource management unit 150 stores the finally generated web application resource, and responds to a reference request of the web application authoring unit 130 during web application authoring.

For this operation, as illustrated in FIG. 6, the web application resource management unit 150 includes a web application resource storage section 151, a web application resource update section 152, a web application resource search permission section 153, and a web application resource providing section 154.

The web application resource storage section 151 is configured to store the resources of the final web application.

The web application resource update section 152 is configured to update the resources of the final web application by transmitting the resources of the final web application to the web application resource storage section 151 in real time when the workflow management unit 140 generates the final web application.

The web application resource search permission section 153 is configured to permit the search for the stored web application resources when the web application authoring unit 130 creates a web application.

The web application resource providing section 154 is configured to provide the found web application resources to the web application authoring unit 130.

The web application preview unit 160 is configured to provide a preview function by applying the final web application in a mobile device environment. That is, the web application preview unit 160 provides a preview function to the user by matching the final web application with the mobile device environment.

Hereinafter, a method for creating a mashup web application in accordance with another embodiment of the present invention will be described in detail as follows with reference to the accompanying drawings.

First, the flow of the method for creating a mashup web application in accordance with the embodiment of the present invention will be schematically described as follows. Detailed descriptions thereof will be made below with reference to the accompanying drawings.

When a user logs in to create a web application, the web application authoring unit generates a web application initial page from previously stored block resources and web application resources. At this time, the previously stored block resources are provided by the block authoring unit. More specifically, during block authoring login, the block authoring unit generates metadata of a block from an open API and generates source code of the block from the block library. Then, the block resource management unit stores a block resource including the metadata and the source code, which are generated by the block authoring unit. This process will be described below in more detail.

Then, the web application authoring unit receives UI-based web application authoring information through the web application initial page, and generates web application metadata.

Then, the workflow management unit verifies the workflow of the web application metadata and generates a final web application when the verification is completed. At this time, the web application may be updated by adding the block resource to the web application metadata.

Then, the web application resource management unit stores and manages the resource of the final web application.

Finally, the web application preview unit 160 provides a preview image by applying the final web application in the mobile device environment.

Figure 7:
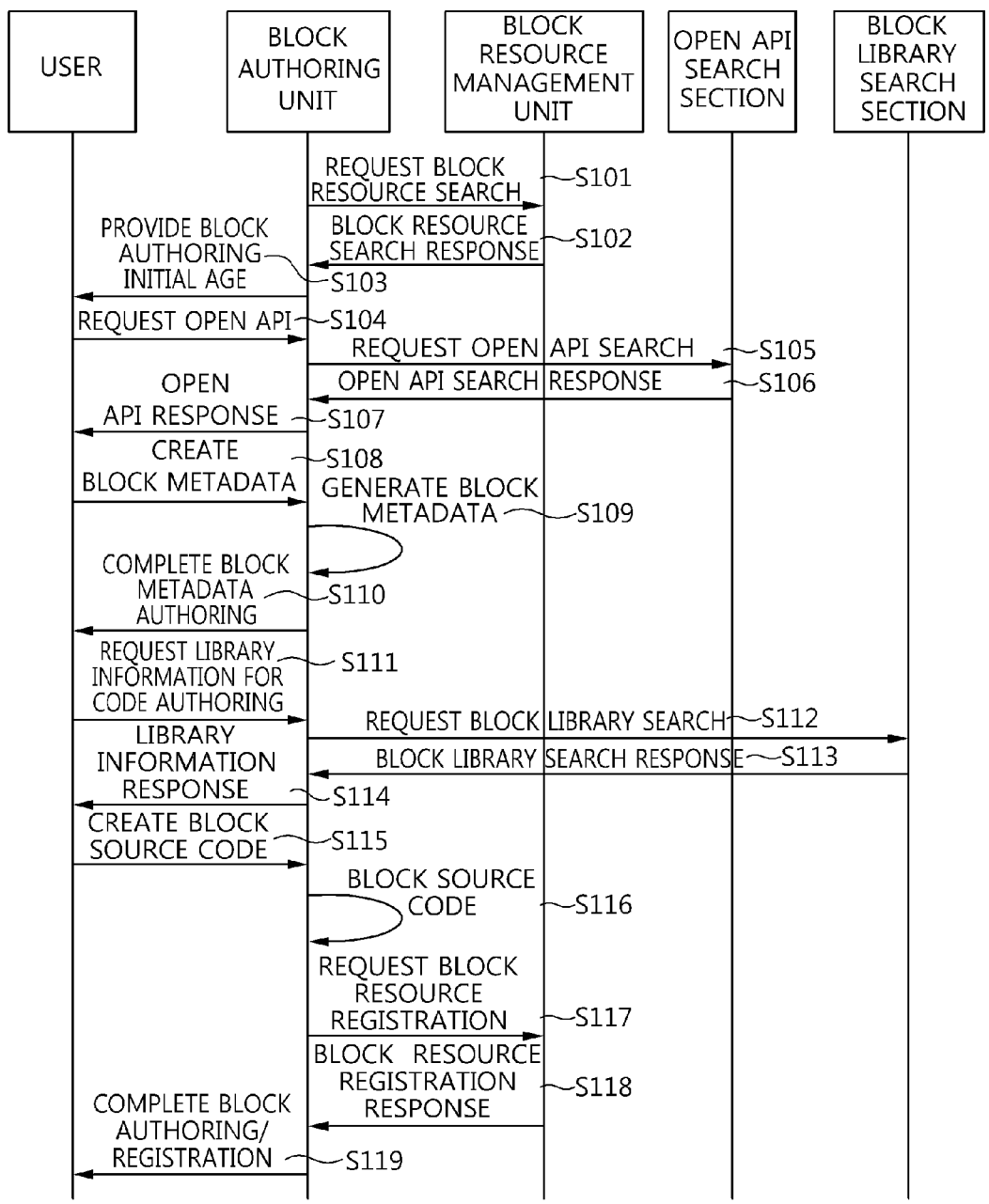
FIG. 7 is a flow chart explaining the process of generating a block resource in accordance with the embodiment of the present invention.
Figure 8:
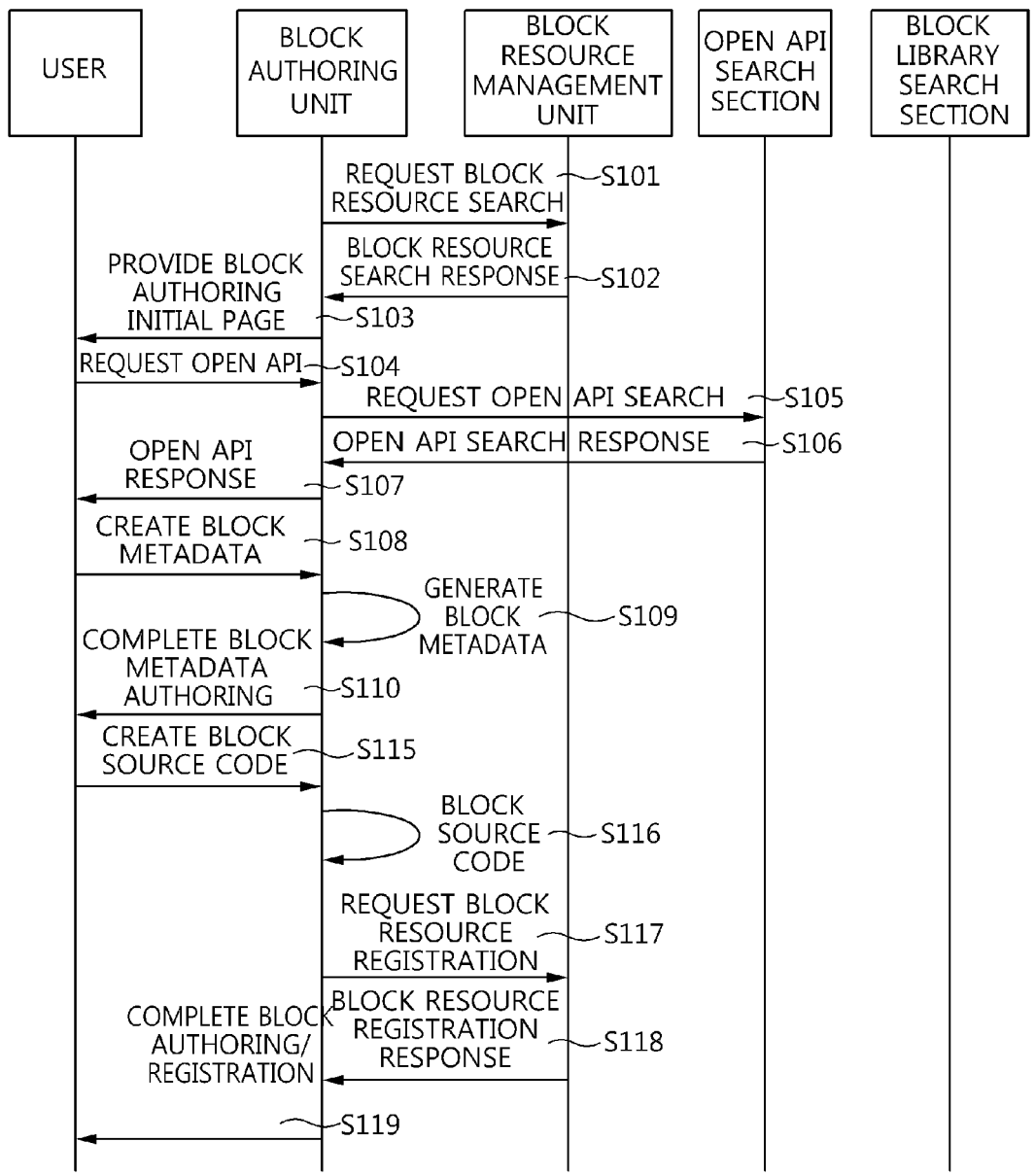
FIG. 8 is a flow chart explaining the process of generating metadata of a block in accordance with the embodiment of the present invention.
Figure 9:
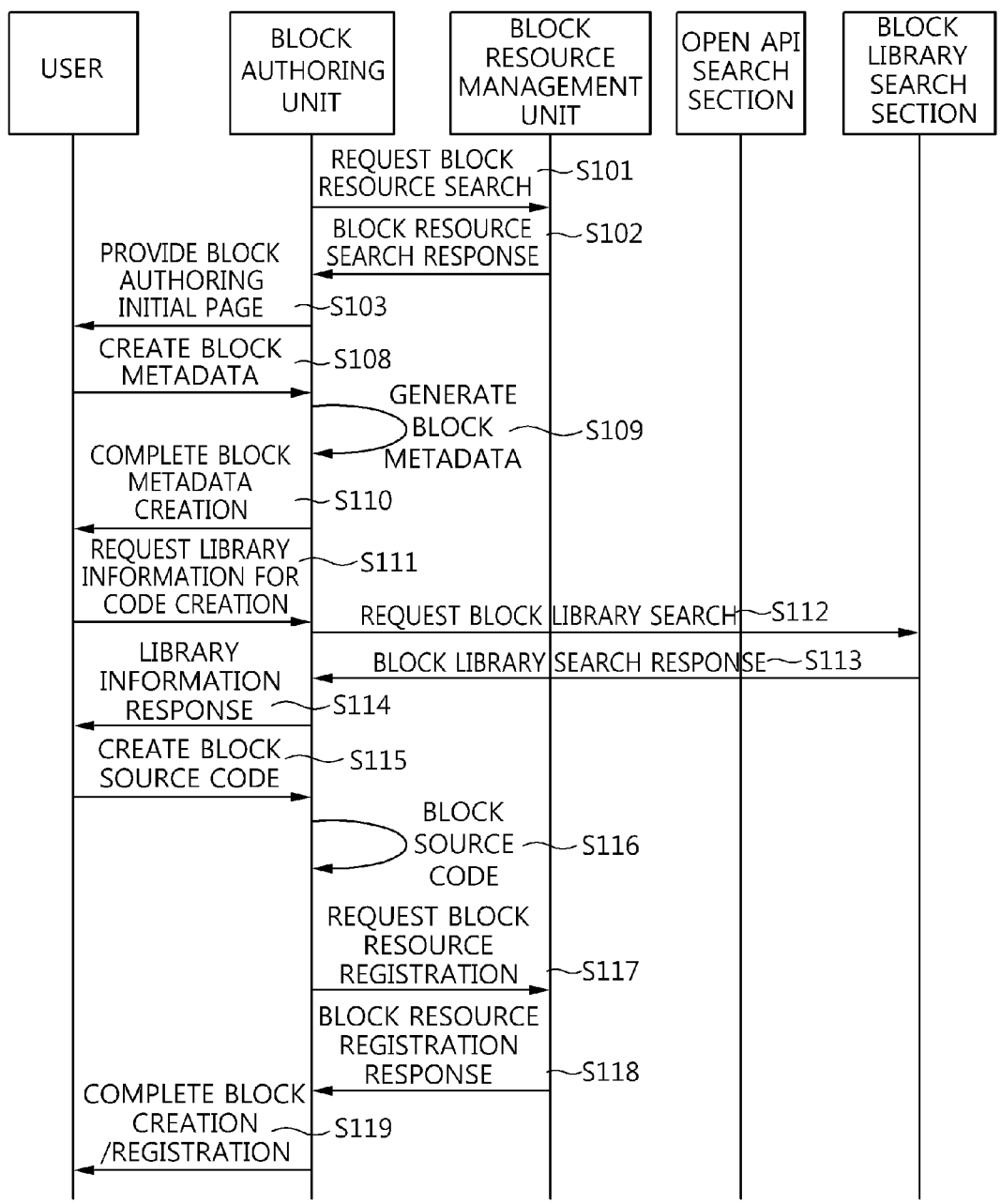
FIG. 9 is a flow chart explaining the process of generating source code of a block in accordance with the embodiment of the present invention.

FIG. 7 is a flow chart explaining the process of generating a block resource in accordance with the embodiment of the present invention. FIG. 8 is a flow chart explaining the process of generating metadata of a block in accordance with the embodiment of the present invention. FIG. 9 is a flow chart explaining the process of generating source code of a block in accordance with the embodiment of the present invention.

Referring to FIGS. 7 to 9, first, a user logs in to create a block resource. Then, the block authoring unit 110 requests the block resource management unit 120 to search block resources at step S101. The block resource management unit 120 makes a response to the search request at step S102. The block authoring unit 110 receiving the response of the block resource management unit 120 provides the user with a initial page for creating a block at step S103. The user receiving the initial page requests open API information from the block authoring unit 110 at step S104. The block authoring unit 110 requests the open API search section to search for an open API, receives a response to the request, and transfers the received response to the user at steps S105 to S107. Then, the user generates a block metadata resource by creating block metadata at steps S108 and S109. After completely creating the block metadata, the user requests block library information for creating source code at steps S110 and S111. The block authoring unit 110 requests the block library search section 114 to search the block library, receives a response to the request, and transfers the received response to the user at steps S112 to S114. Then, the user generates a block source code by creating the block source code at steps S115 and S116. Then, the block authoring unit 110 transmits the block resource, i.e., the metadata and the source code of the block, to the block resource management unit 120 to register the block resource at steps S117 to S119.

Figure 10:
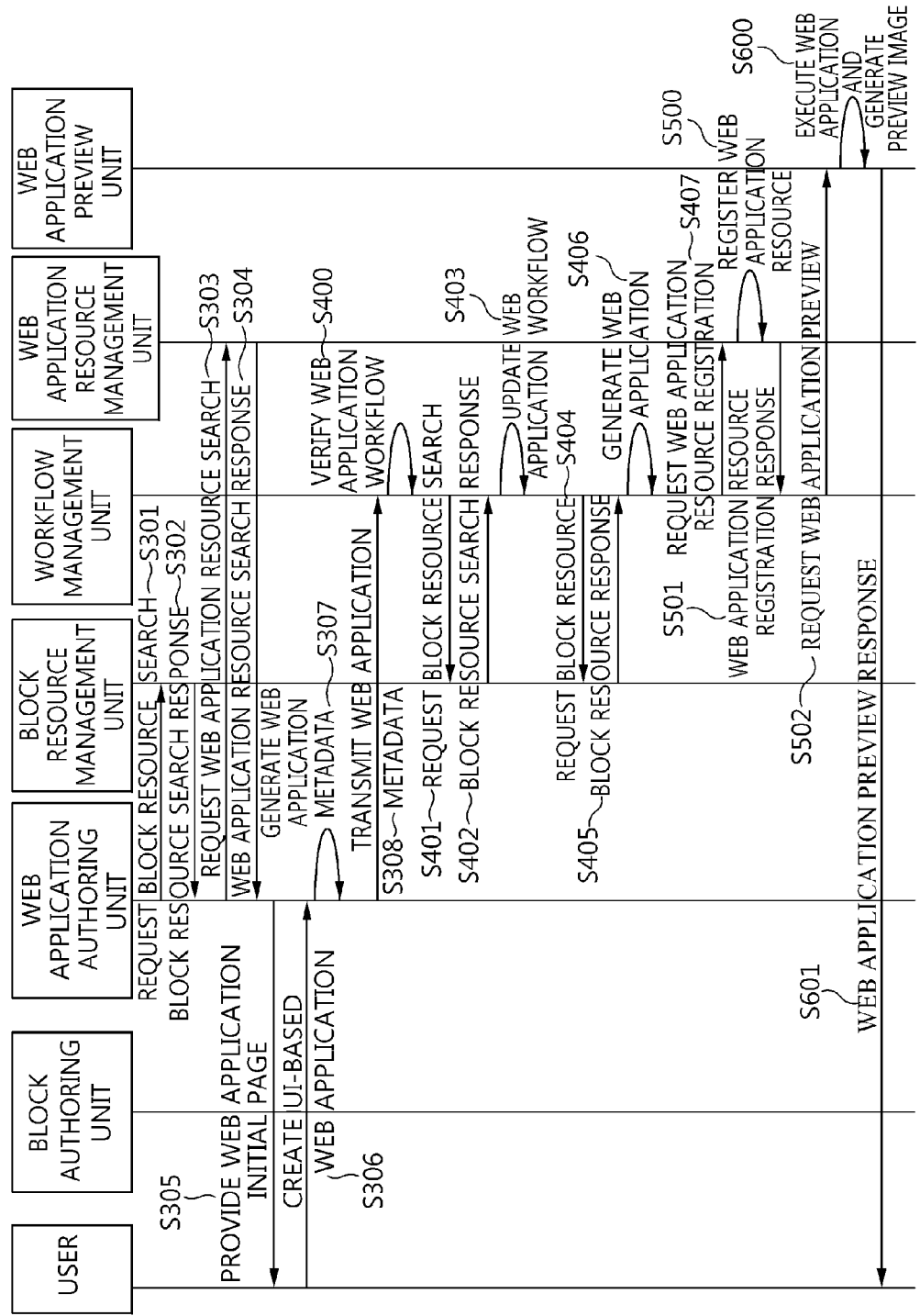
FIG. 10 is a flow chart explaining the process of creating a final web application in accordance with the embodiment of the present invention.

FIG. 10 is a flow chart explaining the process of creating a final web application in accordance with the embodiment of the present invention.

Referring to FIG. 10, first, a user logs in to create a web application. Then, the web application authoring unit 130 requests the block resource management unit 120 to search previously stored block resources and receives a response to the request at steps S301 and S302. Then, the web application authoring unit 130 requests the web application resource management unit 150 to search previously created web application resources and receives a response to the request at steps S303 and S304. The web application authoring unit 130 provides a web application initial page to the user at step S305. The user receives UI-based web application authoring information through the initial page and creates a web application at step S306. The web application authoring unit 130 generates web application metadata based on the authoring of the web application by the user at step S307. The web application authoring unit 130 transmits the generated web application metadata to the workflow management unit 140 at step S308. The workflow management unit 140 verifies the workflow of the received web application at step S400. When verifying the workflow of the web application, the workflow management unit 140 requests the block resource management unit 120 to search block resources and receives a response to the request. At this time, the workflow management unit 140 updates the web application while making a plurality of search requests and receiving a plurality of responses to the respective search requests, thereby generating a final web application at steps S401 to S406. The workflow management unit 140 requests the web application resource management unit 150 to store the resource of the final web application at step S407. The web application resource management unit 150 registers the resource of the final web application and transfers a response to the registration to the workflow management unit 140 at steps S500 and S501. Then, the workflow management unit 140 requests the web application preview unit 160 to provide a preview image of the final web application at step S502. The web application preview unit 160 generates the preview image of the final web application and provides the generated preview image to the user at steps S600 and S601.

As described above, the present invention may provide sub modules related to the authoring of new blocks and web applications, which are the goal of a mashup, such that even general users with no programming or UI design knowledge may take part in developing a mashup web application.

Furthermore, the present invention may help general users to easily participate in producing a mashup web application, thereby increasing the range and applicability of mashup web application development.

While the present invention has been described with respect to specific embodiments thereof, it will be apparent to those skilled in the art that various changes and modifications may be made without departing from the spirit and scope of the invention as defined in the following claims.

What is claimed is:

1. An apparatus for creating a mashup web application, comprising:
   one or more storage devices storing code configured to implement:
   a web application authoring unit configured to generate a web application initial page from previously stored block resources and web application resources, during web application authoring login, receive UI-based web application authoring information through the web application initial page, and generate web application metadata;

a block authoring unit configured to generate the block resources provided to the generation of the web application initial page, at least in part by searching for an open API in response to a request; and a workflow management unit configured to generate a final web application by verifying a workflow of the web application metadata.

2. The apparatus of claim 1, wherein the web application authoring unit comprises:

a block resource search section configured to search for the previously stored block resources and web application resources;

a web application metadata generation section configured to receive the web application authoring information including the previously stored block resources and web-application resources, and generate the web application metadata; and a web application metadata transmission section configured to transmit the web application metadata to the workflow management unit.

3. The apparatus of claim 2, wherein the web application metadata comprises one or more of content, a position of the content, information on a creator, a right condition, a use condition, and a use history.

4. The apparatus of claim 1, wherein the workflow management unit comprises:

a workflow verification section configured to verify the workflow of the web application metadata; and a web application generation section configured to generate the final web application when the verifying is completed.

5. The apparatus of claim 1, wherein the web application authoring unit receives a block resource from a block resource management unit.

6. The apparatus of claim 5, wherein the block resource management unit comprises:

a block resource storage section configured to store the block resource;

a block resource update section configured to update the block resource by transmitting the block resource to the block resource storage section in real time when the block resource is generated;

a block resource search permission section configured to permit block resource searching when the web application authoring unit creates a web application; and a block resource providing section configured to provide the block resource stored in the block resource storage section such that the workflow management unit verifies or updates the workflow of the web application metadata based on the block resource.

7. The apparatus of claim 1, wherein the web application authoring unit receives a web application resource from a web application resource management unit.

8. The apparatus of claim 7, wherein the web application resource management unit comprises:

a web application resource storage section configured to store a resource of the final web application;

a web application resource update section configured to update the resource of the final web application by transmitting the resource to the web application resource storage section in real time when the workflow management unit generates the final web application;

a web application resource search permission section configured to permit a search for previously stored web application resources when the web application authoring unit creates a new web application; and a web application resource providing section configured to provide the previously stored web application resources to the web application authoring unit.

9. The apparatus of claim 1, wherein the web application initial page enables a user to enter the request.

10. The apparatus of claim 1, wherein the block authoring unit comprises:

a block metadata generation section configured to generate metadata of a block from an open API, during block authoring login;

a block code generation section configured to generate a source code, containing program logic of the block, from a block library; and a block resource transmission section configured to transmit a block resource including the generated metadata and source code.

11. The apparatus of claim 10, wherein the block metadata comprises one or more of service, operation, inputs, outputs, attributes, and events, which are to be provided.

12. The apparatus of claim 1, further comprising a web application preview unit configured to provide a preview image by applying the final web application in a mobile device environment.

13. A method for creating a mashup web application, comprising:

generating, by a web application authoring unit, a web application initial page from previously stored block resources and web applications during web application authoring login;

receiving, via the web application initial page, a request to search for open API information;

generating, by a block authoring unit, metadata of a block from an open API during block authoring login based at least partly on a response to the request;

receiving, by the web application authoring unit, UI-based web application authoring information through the web application initial page, and generating web application metadata; and verifying, by a workflow management unit, a workflow of the web application metadata and generating a final web application when the verifying is completed.

14. The method of claim 13, wherein the generating the web application initial page from the previously stored block resources and web applications during web application authoring login comprises:

generating, by the block authoring unit, a source code of the block from a block library; and storing, by the block authoring unit, blocks resources including the generated metadata and source code.

15. The method of claim 13, wherein the verifying the workflow of the web application metadata further comprises updating the web application by adding a block resource to the web application metadata.

16. The method of claim 13, further comprising, after the generating the final web application, storing and managing, by a web application resource management unit, a resource of the final web application.

17. The method of claim 13, further comprising, after the generating the final web application, providing, by a web application preview unit, a preview image by applying the final web application to a mobile device environment.

* * * * *